July 6, 1971
T. P. ENGEL
3,591,674
PROCESS FOR THE PREPARATION OF POLYMERIC MATERIALS Filed March 9, 1967

INVENTOR
Thomas Paul Engel
BY
Sparrow and Sparrow
ATTORNEYS

July 6, 1971 T. P. ENGEL 3,591,674
PROCESS FOR THE PREPARATION OF POLYMERIC MATERIALS
Filed March 9, 1967 5 Sheets-Sheet 5

INVENTOR
Thomas Paul Engel
BY
Sparrow and Sparrow
ATTORNEYS

United States Patent Office 3,591,674
Patented July 6, 1971

3,591,674
PROCESS FOR THE PREPARATION OF
POLYMERIC MATERIALS
Thomas Paul Engel, 6056 Heusenstamm, Offenbach
am Main, Germany
Filed Mar. 9, 1967, Ser. No. 621,952
Claims priority, application Great Britain, Mar. 14, 1966,
11,128/66
Int. Cl. B29d 23/04; B29f 1/08
U.S. Cl. 264—209     20 Claims

ABSTRACT OF THE DISCLOSURE

The present invention relates to a process for the manufacture of shaped articles of a cross-linked thermoplastic material which process comprises mixing a thermoplastic material capable of forming a free radical with a cross-linking agent, subjecting said material to instantaneous compression at a pressure in excess of 2000 atmospheres to effect uniform distribution of the cross-linking agent within said thermoplastic material under conditions such that substantial cross-linking of the thermoplastic material does not occur, and thereafter forming shapes of the mixture and causing or allowing the cross-linking of the shaped material to take place. This invention also includes apparatus comprising a pressure chamber, first and second pressure members capable of operating to exert pressure within said chamber, motor means for said first pressure member adapted to move said first member in said chamber, inlet means for said chamber adapted to be closed by said first member and outlet means for said chamber adapted to be closed by said second member, in which a material introduced into the chamber is subjected to pressure exerted by said first member and which when the pressure exerted on said material reaches a predetermined maximum the second pressure member moves to open the outlet to permit discharge of the material from the chamber.

---

The present invention relates to the manufacture of shaped articles formed from cross-linked thermoplastic materials, and has particular reference to an improved process for effecting cross-linking of such materials and to apparatus for use in that process.

Typical thermoplastic materials have only limited usage because of certain limitations in their physical properties and these materials are not used in many applications for which they are otherwise suitable. Typical of the properties of thermoplastic materials which require improvement are:

Resistance to plastic flow at elevated temperature.
Resistance to some solvents at high temperature.

With some materials, such for example, as the polyolefins, it is possible to obtain a high density polymeric thermoplastic material, which goes some way towards meeting the requirements for these improved properties. However, it has been found in each case that the cross-linked product gives an even greater improvement. Typical of the thermoplastic materials in which cross-linking would be advantageous is polyethylene. The cross-linking of polyethylene is well known and is similar in some respects to the vulcanisation of rubber. The cross-linking of polyolefins in general, and polyethylene is particular, has been effected by the use of high energy radiation and by the use of free radical cross-linking agents. Among the free radical cross-linking agents which have been used, the organic peroxides have been found to be particularly suitable and dicumyl peroxide having the formula:

has been found to give particularly good results.

The use of high energy radiation to effect the cross-linking of polyethylene, while producing a satisfactory product suffers from the disadvantage that the use is limited to articles of thin cross section and that the use necessitates utilisation of expensive equipment and a high power consumption.

The use of a free radical cross-linking agent, on the other hand, does not necessitate the utilisation of such expensive equipment. However, in order to initiate a cross-linking reaction, it is necessary to raise the temperature of the reaction mixture comprising polyethylene and a cross-linking agent, such for example, a dicumyl peroxide.

The mechanism of a typical cross-linking reaction may be explained with reference to the cross-linking of a polyolefin using dicumyl peroxide.

The effect of an increase in temperature is to produce a dissociation of the dicumyl peroxide into two cumyloxy radicals thus:

This dissociation occurs to an appreciable extent at temperature above 135° C.; above 160° C. the dissociation occurs rapidly as the temperature is increased.

The cumyloxy radical itself undergoes further reaction to produce a methyl radical and acetophenone:

Both the methyl radicals and cumyloxy radicals can abstract hydrogen atoms from polyolefins such as polyethylene to generate polyolefin radicals:

A similar reaction occurring for the methyl radical.

Two of the polyolefin radicals thus produced can then combine to produce a cross-linked product thus:

The rate at which the above reaction takes place can be varied by controlling the temperature to which the reaction mixture is raised in order to initiate the dissociation of the dicumyl peroxide. This reaction results in the production of cross-linked polyethylene not involving the use of expensive high energy radiation equipment.

Cross-linked polyethylene and indeed cross-linked thermoplastic materials in general assume the characteristics and properties of a thermosetting material and do not exhibit the flow characteristics of ordinary uncross-linked thermoplastics materials at elevated temperatures. In consequence, it has not, hitherto, been possible to injection mould or to extrude cross-linked thermoplastic materials.

Hitherto, in the processing of a bulk of polyethylene containing a proportion of a free radical cross-linking agent to effect cross-linking of the polyethylene, for example a bulk of polyethylene in a mould, the mould is heated to initiate a cross-linking reaction in the polyethylene. The temperature of the outer portion of the mixture is increased to a temperature at which initiation of the free radical cross-linking reaction takes place, while, as a result of the poor thermal conductivity of the mixture, the inner portion of the mixture remains at a temperature below the threshold temperature for initiation of the cross-linking reaction. Thus, the outer portion of the bulk of polyethylene reaction material in the mould, becomes cross-linked and assumes the properties of a thermosetting material, while the inner portion remains substantially thermoplastic. This presents considerable difficulty when cross-linking polyethylene in an extruder or like apparatus since the cross-linked portion of the polyethylene tends to clog the apparatus. Thus in order that a cross-linking reaction may occur uniformly throughout the bulk of a thermoplastic material, it is desirable that the temperature rise should be uniform throughout the material and having regard to the poor conductivity in general of thermoplastic materials this presents some considerable difficulty.

According to the present invention, there is provided a process for the manufacture of shaped articles of a cross-linked thermoplastic material which process comprises mixing a thermoplastic material capable of forming a free radical with a cross-linking agent, subjecting said material to instantaneous compression at a pressure in excess of 2000 atmospheres to effect uniform distribution of the cross-linking agent within said thermoplastic material under conditions such that substantial cross-linking of the thermoplastic material does not occur, and thereafter forming shapes of the mixture and causing or allowing the cross-linking of the shaped material to take place.

The shapes may be formed from the material by extrusion, and the extrusion and initiation of the cross-linking reaction may be carried out simultaneously. Alternatively, the initiation of the cross-linking reaction may be carried out subsequent to the formation of shapes of the material. In a further embodiment of the invention the initiation of the cross-linking reaction may be carried out prior to the formation of shaped articles of the mixture, the shaping being performed before the thermoplastic material assumes the thermosetting properties of a substantially cross-linked material.

The cross-linking reaction may initiated by heating the thermoplastic material mixture after compression to a temperature above the threshold temperature for the cross-linking reaction to occur.

A proportion of an inhibitor may be included in the mixture prior to compression in order to inhibit the rate of cross-linking reaction after initiation. In this way, the material after initiation of the cross-linking reaction, possesses sufficient flow characteristics to enable the material so treated to be extruded or moulded before the cross-linking reaction has gone to completion. Typical cross-linking agents are the organic peroxides and in particular dicumyl peroxide. The proportion of cross-linking agent is typically of the order of ½% by weight based on the total weight of the thermoplastic material to be subjected to a cross-linking thermoplastic material to be subjected to a cross-linking reaction although a proportion of as little as 0.25% have been found to give perfectly satisfactory results. The cross-linking agent may be used in conjunction with a catalyst to assist and/or promote the cross-linking reaction within the thermoplastic material. Typical catalysts are chromium, methacrylic acid esters such as those commercially available under the registered trademark "Pleximon," triallylcyanurates, diallylphthalate such as that commercially available under the trademark "Dapon" and supplied by the FMC Corporation and divinyl benzene.

The process of the present invention is applicable to any thermoplastic material capable of forming a free radical which can take part in a cross-linking reaction.

Thus, for instance, polyethylene terephthalates such as those available under the registered trademarks "Orlon" and "Dacron" have been successfully cross-linked by the process in accordance with the present invention.

The present invention has particular reference to polyolefins, and extremely good results have been obtained with materials such as polyethylene and polypropylene. The phenol-formaldehyde resins, resorcinol-formaldehyde resins polyvinyl halides and polyvinylidene halides have also been found to give good results.

The mixture of thermoplastic material and cross-linking agent may also include a proportion of filler, such as talcum, china clay, carbon black and chalk.

When the thermoplastic material is a polyolefin, a product having excellent properties may be obtained by starting from material having a high molecular weight, that is to say, of the order of 350,000. It has also been found that an increase in the crystallinity of the material results in a harder cross-linked product while material of lower crystallinity results in increasing resilience of the cross-linked product. Accordingly, it is possible to control to a limited extent the properties of the cross-linked material depending upon the purpose for which it is to be used.

Although the advantages of the present invention are achieved by subjecting the mixture of cross-linking agent and thermoplastic material to instantaneous compression at pressures as low as 3,500 atmospheres it has been found that pressures above 4,500 atmospheres give improved results. Typically, pressures within the range 8,000 to 11,000 atmospheres, and particularly 9,000 to 10,000 atmospheres, have been found to give excellent results.

In a typical embodiment of the present invention, the mixture of cross-linking agent and thermoplastic material is introduced into an autoclave at a temperature of the order of 25° C. After instantaneous compression in the autoclave the material discharged therefrom has a temperature of the order of 110° C. and is then passed to an extrusion die which is heated to a temperature of 160° C. thereby producing an extruded cross-linked product.

The present invention also includes apparatus for subjecting a material to pressure, which apparatus comprises a pressure chamber, first and second pressure members capable of operating to exert pressure within said chamber, motor means for said first pressure member adapted to move said first member in said chamber, inlet means for said chamber adapted to be closed by said first member and outlet means for said chamber adapted to be closed by said second member, the arrangement being such that a material introduced into said chamber by said inlet is subjected to pressure exerted by said first member so that, when the pressure exerted on said material reaches a predetermined maximum, the second member moves to open the outlet thereby causing or allowing the material to be discharged from the chamber.

In a preferred embodiment of the apparatus of the present invention, the second member is spring loaded into position closing the outlet, the pressure of said spring loading being adjustable in order to alter the yield pressure of said second member.

Following is a description with reference to the accompanying drawings of pressure apparatus in accordance with the present invention.

Figure 1:
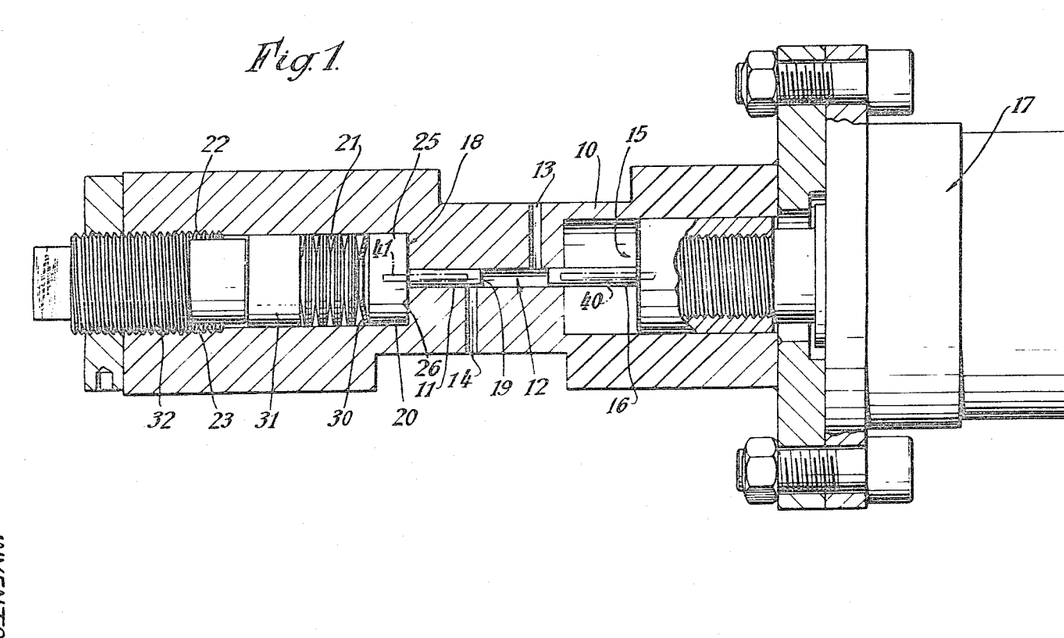
FIG. 1 is a section through the pressure apparatus of the invention.

The pressure apparatus includes a housing 10 which is provided with an elongate cylindrical bore 11 comprising the pressure chamber 12, said chamber 12 being disposed with its elongate axis in a forward-rearward direction. The chamber 12 is provided with a pair of spaced radially disposed passages 13 and 14, the inlet passage 13 being disposed towards the rearward end of the pressure chamber 12 and the outlet passage 14 being disposed towards the forward end of the chamber 12. The first pressure member 15 comprises an elongate cylindrical piston 16 adapted for sliding movement within said elongate cylindrical bore 11 constituting the pressure chamber 12 so that, with said first piston 16 in the rearward position, the inlet passage 13 to the chamber 12 is open, and with the first piston 16 in the forward position the inlet passage 13 to the chamber 12 is closed by the body of said piston 16. The first piston 16 is connected to a hydraulic motor means, indicated generally at 17, for applying pressure thereto to urge the first piston 16 in a forward direction, said motor means also being capable of withdrawing the first piston 16 in a rearward direction.

The second pressure member 18 comprises an elongate second piston 19 adapted to fit the elongate bore 11 constituting the pressure chamber 12 for sliding movement therein. The elongate bore 11 constituting the pressure chamber 12 is expanded at its forward end to a cylindrical bore 20 of greater diameter than the elongate cylindrical bore 11, the rearward portion 21 of the expanded bore 20 being substantially smooth and the forward portion 22 of said bore 20 being provided with a thread 23. The second piston 19 is provided at its forward end with an expanded piston element 25 which fits the expanded bore 20, the second piston 19 and its attached expanded element 25 being capable of limited forward-rearward movement within their respective bores 11 and 20, the arrangement being such that, with the second piston 19 in the rearward position, that is to say, with the annular rearward face 26 of the expanded element 25 abutting the annular surface between the cylindrical surface of the expanded bore 20 and the cylindrical surface of the elongate bore 11, the second piston 19 closes the forward radially disposed outlet 14 from the pressure chamber 12. The expanded element 25 and the second piston 19 attached thereto are biassed to the said rearward position by means of a spring 30 disposed forwardly of the expanded element 25. The spring 30 abuts at its forward end a cylindrical packing member 31 which is maintained within the expanded bore 20 by means of an elongated threaded adjusting member 32 located in the forward end 20 of the expanded bore 20 in the housing 10 so that rotation of said elongated adjustable member 32 causes said member 32 to move in a forward or rearward direction by virtue of the engagement of the thread on the member with the thread 23 on the inner surface of the expanded bore 20, thereby causing or allowing corresponding movement of the packing member 31 disposed between the rearward end of said elongated adjusting member 32 and the forward end of said spring 30 so as to alter the tension of the spring 30 thereby altering the yield pressure of the second piston 19.

Thus, in order to increase the yield pressure of the second piston 19, the adjusting member 32 is rotated to urge said member 32 in a rearward direction thereby causing said packing member 31 to slide within said expanded bore 20 in the housing 10 in a rearward direction to compress the spring 30 disposed between said packing member 31 and the expanded element 25.

Figure 2:
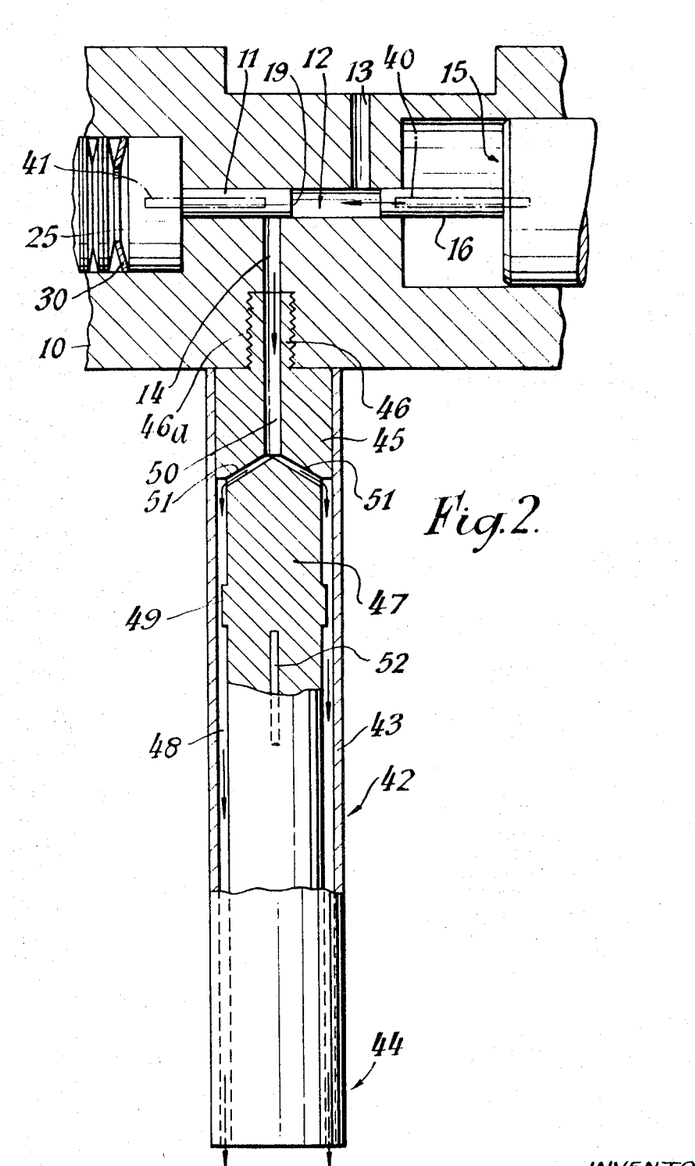
FIG. 2 is a scrap section of FIG. 1 showing an extrusion die attachment.

The outlet conduit 14 of the apparatus is provided toward the exit thereof from the block housing the pressure chamber 12 with an expanded cylindrical portion 46 the walls of which are screw-threaded. The outlet 14 debouches into an electrically heated extrusion die 42 for extruding material discharged from said pressure apparatus or autoclave into the form of a tube.

The extrusion die 42 comprises an outer cylindrical tubular portion 43, extending from a forward end adjacent the body 10 of the autoclave and extending and terminating in a rearward end 44 remote from the autoclave. The forward end of said cylindrical portion 43 is closed by a cylindrical plug 45 having in the forward face thereof an upstanding screw-threaded spigot 46a adapted to engage with the screw-threaded inner surface of the expanded portion 46 of the outlet passage 14 of the autoclave. The rearward portion of the closure plug 45 carries an elongate cylindrical mandrel 47 substantially concentric with the cylindrical tubular portion 48 between the cylindrical tubular portion 43 of the die 42 and the mandrel 47. The mandrel 47 carries toward its forward end and in spaced relationship from the rearward end of the plug 45, an annular ridge 49 adapted to provide a constriction in said annular passage 48.

The spigot 46 and closure plug 45 are provided with a centrally disposed axial passage 50 which divides toward the rearward end of the closure plug 45 in a plurality of, for instance, five, conduits 51 debouching in the annular face of the closure plug between the mandrel 47 and the cylindrical tubular portion 43 and serving to connect said axial passage 50 and said annular tubular passage 48.

In operation, a mixture of thermoplastic material typically polyethylene and cross-linking agent is introduced into the pressure apparatus with the first piston 16 and the second piston 19 in the rearward direction, the reaction mixture being introduced via inlet passage 13 into the pressure chamber 12.

The first piston 16 moves under the influence of motor means 17 driving said piston 16 in a forward direction toward the second piston 19 thereby instantaneously increasing the pressure on the mixture of thermoplastic material and cross-linking agent within the chamber 12 and raising the temperature of the reaction mixture. On rapidly increasing the presure toward the predetermined level i.e. 8,000 to 10,000 atmospheres, the temperature of the mixture rises and the cross-linking agent is thoroughly distributed throughout the thermoplastic material. As the pressure exerted upon the polyethylene within the chamber 12 approaches the predetermined level, the second piston 19 moves forward under the influence of the pressure exerted by the first piston 16 and transmitted through the mixture in chamber 12 forwardly against its spring bias thereby exposing the outlet passage 14 and forcing the still thermoplastic mixture out of the pressure chamber 12 via said outlet 14 and into the extrusion die 42 described above. The first piston 16 advances forwardly until all of the polyethylene mixture has been expelled from said chamber 12 and until the forward portion of said first piston 16 is abutting the rearward surface of said second piston 19. On withdrawing the first piston 16 in a rearward direction, the second piston 19 moves under the influence of the spring 30 in a rearward direction until the expanded element 25 abuts the annular surface of the rearward end of the expanded portion 20 in the housing so that the second piston 19 is now closing the outlet passage 14 from the chamber 12. Rearward movement of the first piston results in the formation of a vacuum within the pressure chamber 12 so that with the first piston in its rearward position the inlet passage 13 is open to admit a further supply of the thermoplastic material/cross-linking agent mixture prior to repeating the cycle.

Instead of the hydraulic motor means illustrated a mechanical motor means may be employed in order to obtain a faster supply of material from the outlet 14.

The compressed material discharged from the autoclave or pressure apparatus described above leaves the autoclave via passage 14 and which while still in a thermoplastic state, is discharged from the pressure apparatus and passes along the passage 50 in the spigot 46a and via the plurality of passage 51 and into the cylindrical passage 48 between the mandrel 47 and the cylindrical tubular portion 43. The material then passes rearwardly along said annular passage 48, passes the constriction 49 where the individual ribbons issuing from said plurality of passages are fused together to form a continuous tube. The central portion 52 of the mandrel 47 rearwardly of said constriction 49 is electrically heated at 52 to raise the temperature of the thermoplastic material passing along the mandrel 47 to initiate and effect the cross-linking reactions so that towards the rearward end of the mandrel the material is substantially cross-linked.

Figure 3:
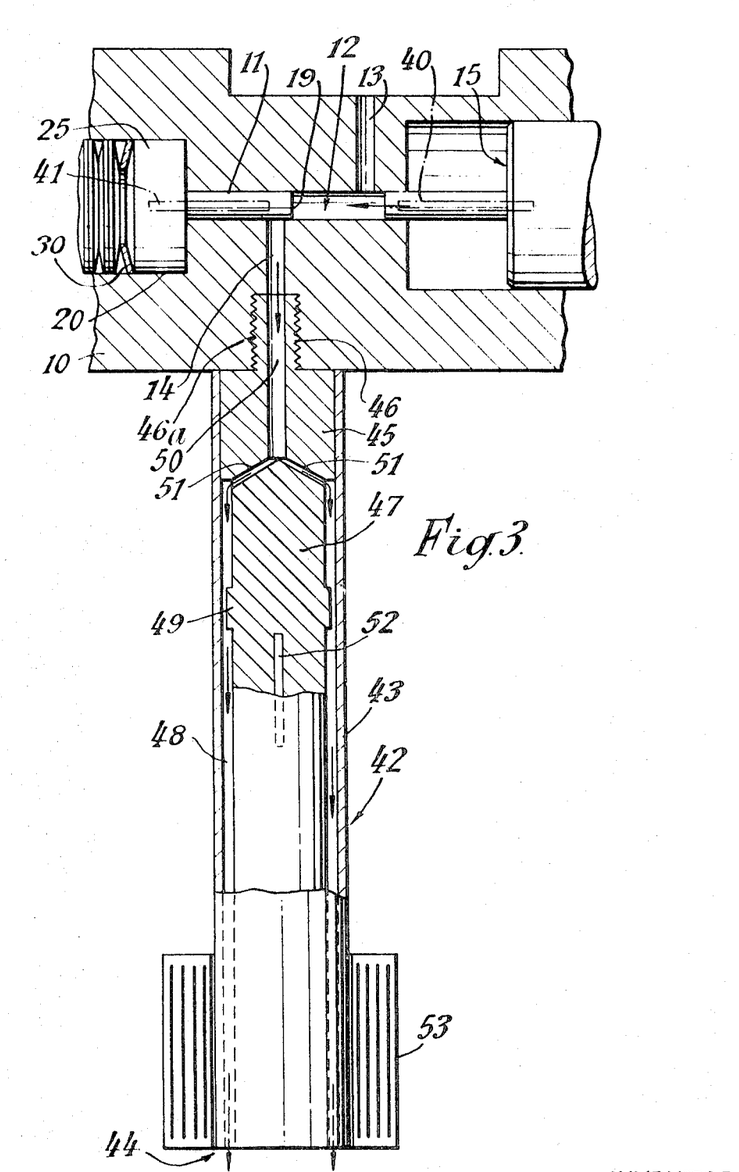
FIG. 3 is a scrap section of FIG. 1 showing another embodiment of the die of FIG. 2.

In an alternative embodiment of the apparatus described above the rearward portion of the mandrel 47 and the outer cylindrical portion 43 is water cooled at 53 so as to shrink the extrudate onto the mandrel 47 and create a back pressure in the electrically heated portion, thereby increasing the crystallinity of the extruded product.

Figure 4:
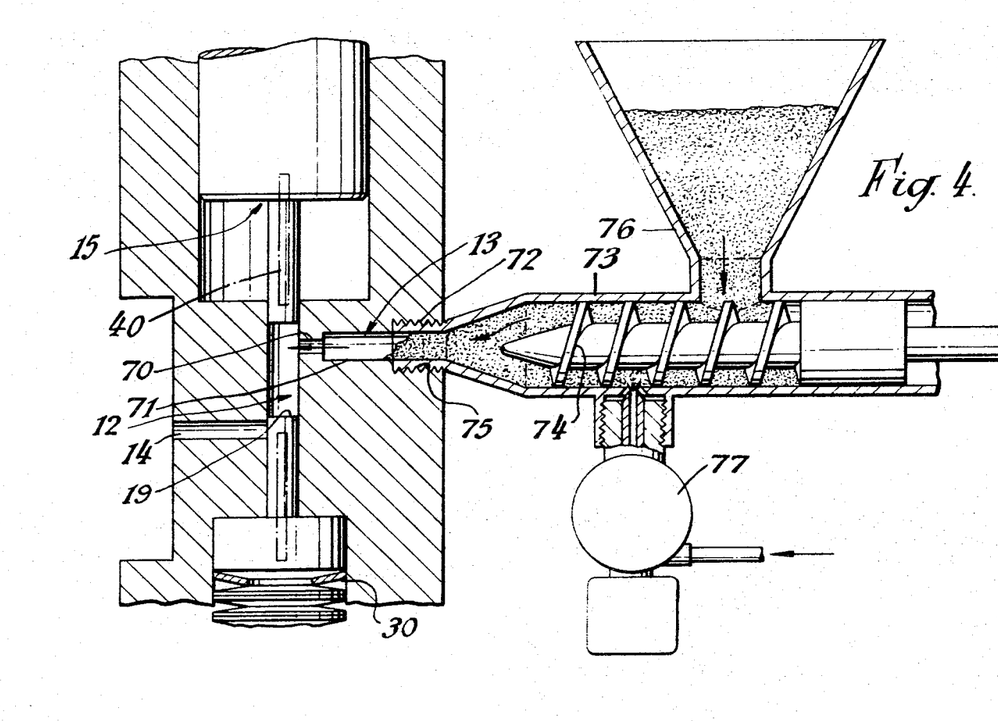
FIG. 4 is a scrap section showing a modified inlet arrangement for the apparatus of FIG. 1.
Figure 5:
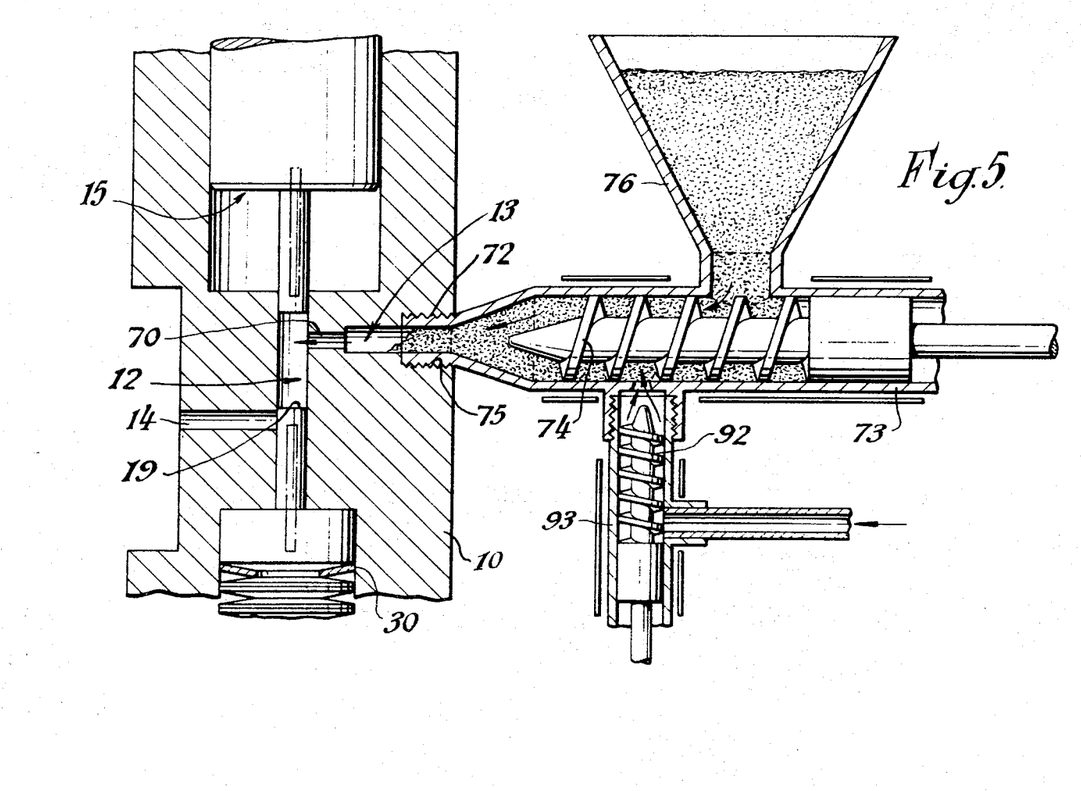
FIG. 5 is an alternative embodiment of the arrangement shown in FIG. 4.

In order to provide a constant supply of intimately mixed thermoplastic material/cross-linking agent mixture at the inlet 13 of the pressure apparatus illustrated in FIG. 1, the apparatus may be modified by enlarging the inlet passage 13 towards the outer end of the housing 10 so that the inlet passage 13 comprises an inlet orifice 70 and an intermediate expanded portion 71 of the inlet indicated generally by numeral 13 in FIGS. 4 and 5 of the accompanying drawings. The expanded intermediate portion 71 is further expanded towards the outer surface of the housing 10 said outer expanded portion 72 being screw threaded.

An elongate cylindrical tube 73 carries a transport screw element 74 therein, and arranged for rotation with respect to tube 73 so that the flights of screw element 74 can effect transport of material introduced into tube 73 at its forward end, from the forward end to the rearward end of the tube 73. The tube 73 is provided in the outer surface of its rearward end with a screw threaded portion 75 which engages with the screw threaded expanded portion 72 of the inlet 13 in the housing 10 of the pressure apparatus. The screw element 74 disposed within the elongate cylindrical tube 73 extends rearwardly of the rearward end of said tube 73 and the rearwardly extending portion of screw element 74 is accommodated in the intermediate portion 71 of the inlet 13 of the housing 10.

The cylindrical tube 73 is provided in the circumferential surface thereof towards the forward end with a hopper 76 for supply of material to the forward end of the tube. The cylindrical tube 73 is further provided intermediate the rearward end 75 and the hopper 76 with a metering pump 77 adapted to introduce into the tube 73 a continuously metered proportion of one or more liquid ingredients to be included in the thermoplastic material to be supplied to the pressure apparatus. The transport screw element 74 is positively driven by means of motor means (not shown) so that a liquid or particulate thermoplastics material supplied to hopper 76 may be continuously transported along tube 73 and into inlet 13 of the pressure apparatus and is injected into the pressure chamber 12 by means of inlet orifice 70. The pump 77 serves to inject continuously proportions of liquid cross-linking agent in desired proportions the flights of the screw effect mixing prior to introduction of the mixture via orifice 70 into the pressure chamber 12.

In an alternative embodiment, illustrated in FIG. 5, the pump 77 may be substituted by a further extruder and hopper arangement to introduce small proportions of a particulate solid cross-linking agent into the mass of thermoplastic material being transported by extruder screw 74, the speed of extruder screw 92 being controlled to effect the desired rate of introduction of cross-linking agent into the plastics material entrained by screw 74. Mixing of the material and cross-linking agent takes place as the material and cross-linking agent passes along tube 73 towards the orifice 70. In this embodiment the barrel 93 housing extruder screw 92 and the barrel 73 housing extruder screw 74 are each electrically heated.

Following is a description by way of example of the production of cross-linked materials in accordance with the present invention.

EXAMPLE 1

Finely divided polyethylene was mixed with 2.5 percent by weight on the weight of the polyethylene of dicumyl peroxide and the resulting mixture was introduced into the apparatus described above. The adjusting mechanism of the apparatus was set so that the second piston 19 yields when the pressure exerted within the chamber 12 is of the order of 10,000 atmospheres of pressure.

The temperature of the material leaving outlet 14 of the apparatus and entering the passage in the spigot of the extrusion die is of the order of 110° C. The material passes through the passage in the spigot in the closure plug and rearwardly via said distributing passage into the annular passage between the mandrel and the cylindrical portion. The material then passes the annular constriction and over the heated portion of the mandrel where the temperature is raised to approximately 160° C. at which temperature cross-linking reaction proceeds rapidly to completion and the cross-linked tube of polyethylene is obtained from the rearward end of the extrusion die.

The resulting cross-liked tubing is extremely hard and does not soften appreciably on heating. It is possible to form an U-shaped tube of the material and to boil water in the tube over a naked bunsen flame without damaging the cross-linked material.

EXAMPLE 2

Example 1 was repeated using finely divided polyethylene and ½% by weight of dicumyl peroxide. The pressure chamber was adjusted so that the pressure exerted in the chamber was 8,000 atmospheres and the resulting cross-linked material issuing from the end of the die was rolled while still hot, onto a drum. Before commencing rolling, the open end of the tube was plugged and the action of rolling together with the action of drawing the material from the mandrel resulted in collapse of the tubing to a flattened tube as it was rolled on the drum. This collapse resulted from the partial vacuum which exists within the tubing due to the drawing action from the end of the mandrel of extrusion die. When a desired amount of the tubing has been wound on the drum the tubing is severed and the material on the drum is allowed to cool. Since the material on the drum is fully cross-linked and non-thermoplastic, no fusion between adjacent wraps of the tubing occurs.

The drum of tubing may be transported to a site in which it is to be used, for instance, as a water main, and is unrolled from the drum, the tubing still having its flattened configuration. The end of the flattened tubing is passed through a sleeve containing heating elements adapted to rapidly raise the temperature of the tubing to the order of 200° C. At this temperature the flattened tubing expands to form a tube of substantially circular cross-section, this property of the tubing facilitates transport and ease of laying of cross-linked tubular material. Cross-linked polyethylene tubing treated in this way shows no disadvantage from the cross-linked material obtained direct from the mandrel of the extrusion die during manufacture and has the advantage that the bulk of the material is greatly reduced for transport purposes.

EXAMPLE 3

Example 1 was repeated using a mixture of 1,000 g. of high density polyethylene, 5 g. of cumyl peroxide cross-linking agent and 5 g. of a bis-methacrylic acid ester catalyst. The pressure exerted in the chamber was in the order of 8,000 atmospheres, the temperature in the autoclave was 120° C. The temperature of the mandrel of the extrusion die was such as to raise the temperature of the extrudate to approximately 180° C.

A very well cross-linked product having good transparency was obtained.

EXAMPLE 4

Example 1 was repeated using a phenol formaldehyde resin and an accelerator therefor. A small amount of the resin was extruded using the apparatus described above the pressure in the chamber being of the order of 8,500 atmospheres. The result was a cross-linked pipe of phenol formaldehyde resin having extremely good hardness and a very fine surface finish.

EXAMPLE 5

Example 1 was repeated but the rearward end of the mandrel and the outer portion were each subjected to water cooling so that the temperature of the polyethylene being extruded along the mandrel was rapidly decreased. This resulted in the polyethylene material shrinking about the mandrel to produce a back pressure across the heated portion of the mandrel. The result was a cross-linked product of high crystallinity and improved hardness when compared with the product of Example 1. On examining the two products it was noted that the product of Example 1 had a lower crystallinity than the product of the present example.

EXAMPLE 6

Example 1 was repeated using a linear polyethylene manufactured by B.A.S.F. of Ludwigshafen, Germany. A proportion of 0.25% by weight of ditertiarybutyl peroxide and 0.24% by weight of diallylphthalate each based on the weight of polyethylene was added to the polyethylene material and after mixing, the mixture was introduced into the pressure chamber 12 of the apparatus described above. A pressure of 9,000 atmospheres was exerted on aliquots of the mixture in the pressure chamber, the temperature of the pressure chamber being 100° C. The temperature of the mandrel of the extrusion die was such as to raise the temperature of the extrudate to 200° C. A pipe having the dimensions 25 by 31 millimetres was produced at a rate of 12 kilograms per hour. The cross-linked material comprising the pipe had a molecular weight greater than 10,000,000 and a cross-linking factor of 97%.

EXAMPLE 7

The preceding example was repeated for the production of a pipe having the dimensions 23 by 31 millimetres except that proportions of inorganic catalysts were included in the cross-linking agent added to the polyethylene. The cross-linking agents comprise 0.25% by weight of titanium chloride, 0.25% by weight of vanadium trichloride and 0.50% by weight of ditertiarybutyl peroxide. The compression was carried out at a pressure of 9,000 atmospheres and the temperature of the compression chamber was 100° C. The temperature of the mandrel of the extrusion die was maintained at 200° C. to initiate the cross-linking reaction and a pipe having good mechanical properties was produced at the rate of 12 kilograms per hour.

EXAMPLE 8

Example 6 was repeated for the production of an extruded pipe having the dimensions 25 by 31 millimetres, the polyethylene of Example 6 being substituted by polyethylene terephthalate available under the trademarks "Orlon" and "Dacron." A proportion of 0.40% by weight of a diallyl phthalate prepolymer available under the registered trademark "Diapon" together with 15% by weight of inert filler was added to the polyethylene terephthalate and after mixing, the thermoplastic mixture was introduced into pressure chamber 12 of the apparatus described above where the mixture was subjected to a compression of 7,000 atmospheres pressure at a pressure chamber temperature of 60° C.

The mandrel of the extrusion die was maintained at 100° C. and it was noticed that polymerisation and cross-linking took place very rapidly to give a cross-linked pipe having good thermal properties.

The proportions of tubing prepared in accordance with each of the examples described above can be cemented together using an epoxy resin to produce a unitary structure.

I claim:

1. A process for the manufacture of shaped articles of a cross-linked thermoplastics material, which process comprises mixing a thermoplastic material capable of forming a free radical with a cross-linking agent, feeding said mixture into a compression chamber, ramming said mixture and applying to said mixture thereby a predetermined pressure within the range of 8,000 to 11,000 atmospheres so that substantial cross-linking of the thermoplastic material does not occur, said mixture being heated through said ramming in said compression chamber, forcing said mixture under pressure from said compression chamber, and thereafter shaping the mixture and initiating or allowing cross-linking of the shaped material to take place.

2. A process for the manufacture of shaped articles as claimed in claim 1 wherein said shaping is by extrusion and wherein said extrusion and initiating of the cross-linking reaction are carried out simultaneously.

3. A process for the manufacture of shaped articles as claimed in claim 1 wherein said initiating of the cross-linking reaction is carried out subsequent to the shaping of the mixture.

4. A process for the manufacture of shaped articles as claimed in claim 1 wherein said initiating of the cross-linking reaction is carried out prior to the formation of shaped articles, the shaping being performed before the thermoplastic material assumes substantially cross-linked characteristics.

5. A process as claimed in claim 1 wherein said cross-linking is initiated by heating the thermoplastic material to a temperature above the threshold temperature for the cross-linking reaction to occur.

6. A process as claimed in claim 1 wherein a proportion of inhibitor is included in the mixture prior to compression in order to inhibit the rate of the cross-linking reaction after initiation.

7. A process as claimed in claim 1 wherein the cross-linking agent is an organic peroxide, in the form of peroxide.

8. A process as claimed in claim 1 wherein the proportion of cross-linking agent within the mixture is within the range 0.25 to 1.0% by weight based on the total weight of the thermoplastic material.

9. A process as claimed in claim 8 wherein the proportion of cross-linking agent is 0.5% by weight.

10. A process as claimed in claim 1 wherein the mixture prior to compression also includes a proportion of a catalyst for the cross-linking of thermoplastic material.

11. A process as claimed in claim 10 wherein said catalyst is selected from the group consisting of chromium, methacrylic acid esters, triallyl cyanurates, diallyl phthalate and divinyl benzene.

12. A process as claimed in claim 1 wherein said thermoplastic material is at least one which is selected from the group consisting of polethylene terephthalate, polyolefin, phenol formaldehyde resin, resorcinol formaldehyde resin, polyvinyl halide, and polyvinylidene halide.

13. A process as claimed in claim 12 wherein the thermoplastics material is at least one which is selected from the group consisting of polyethylene and polypropylene.

14. A process as claimed in claim 1 wherein said thermoplastics material is a polyolefin having a high molecular weight of the order of 350,000.

15. A process as claimed in claim 1 wherein the mixture of thermoplastic material and cross-linking agent includes a proportion of a filler in the forming of talcum, china clay, carbon black and chalk.

16. The process as claimed in claim 1 including the steps of introducing the mixture into an autoclave at a temperature of 25° C. prior to compression, discharging the material after instantaneous compression from said autoclave at a temperature within the range 100–120° C.; and passing the material thereafter to an extrusion die heated to a temperature exceeding 140° C., for initiating cross-linking within the mixture.

17. The process as claimed in claim 1 including the steps of extruding the compressed mixture through a heated die to effect cross-linking within the mixture; forming said mixture into a tube during said extruding step; and rolling said tube while still hot after emerging from said heated die into a drum.

18. The process as claimed in claim 17 including the step of plugging the open end of said tube for collapsing said tube and forming a flattened tube through said extruding and rolling steps.

19. The process as claimed in claim 18 including the steps of unrolling said flattened tube from said drum so that said tube remains flattened; and heating said flattened tube rapidly to a temperature exceeding 150° C., whereby said flattened tube expands to form a tube of substantially circular cross-section.

20. A process for the manufacture of shaped articles of a cross-linked thermoplastics material, which process comprises mixing a thermoplastic material capable of forming a free radical with a cross-linking agent, feeding said mixture into a compression chamber, ramming said mixture and applying to said mixture thereby a predetermined pressure within the range of 9,000 to 10,000 atmospheres so that substantial cross-linking of the thermoplastic material does not occur, said mixture being heated through said ramming in said compression chamber, forcing said mixture under pressure from said compression chamber, and thereafter shaping the mixture and initiating or allowing cross-linking of the shaped material to take place.

References Cited

UNITED STATES PATENTS

| | | | |
|---|---|---|---|
| 3,417,176 | 12/1968 | Anderson | 264—230 |
| 3,265,800 | 8/1966 | Trunk | 264—328 |
| 3,107,234 | 10/1963 | Stewart | 264—328 |

ROBERT F. WHITE, Primary Examiner

R. SHEAR, Assistant Examiner

U.S. Cl. X.R.

264—210, 211, 236, 329

UNITED STATES PATENT OFFICE
CERTIFICATE OF CORRECTION

Patent No. 3,591,674            Dated   July 6, 1971

Inventor(s)   Thomas Paul Engel

It is certified that error appears in the above-identified patent and that said Letters Patent are hereby corrected as shown below:

In the heading to the printed specification, line 6, "Ser. No. 621,952" should read -- Ser. No. 621,962 --.

Signed and sealed this 7th day of March 1972.

(SEAL)
Attest:

EDWARD M. FLETCHER, JR.                 ROBERT GOTTSCHALK
Attesting Officer                       Commissioner of Patents